(12) United States Patent
Axelsson et al.

(10) Patent No.: US 9,168,583 B2
(45) Date of Patent: Oct. 27, 2015

(54) NON-ROTATING SHAFT FOR A CONTINUOUS CASTING MACHINE

(75) Inventors: Magnus Axelsson, Göteborg (SE); Patrik Costa, Älvängen (SE)

(73) Assignee: AKTIEBOLAGET SKF (SE)

( * ) Notice: Subject to any disclaimer, the term of this patent is extended or adjusted under 35 U.S.C. 154(b) by 1439 days.

(21) Appl. No.: 12/312,894

(22) PCT Filed: Nov. 30, 2006

(86) PCT No.: PCT/SE2006/001367
§ 371 (c)(1),
(2), (4) Date: Oct. 18, 2010

(87) PCT Pub. No.: WO2008/066420
PCT Pub. Date: Jun. 5, 2008

(65) Prior Publication Data
US 2011/0023653 A1    Feb. 3, 2011

(51) Int. Cl.
*F16C 3/02* (2006.01)
*B22D 11/128* (2006.01)
*F16C 13/02* (2006.01)

(52) U.S. Cl.
CPC .............. *B22D 11/1287* (2013.01); *F16C 3/02* (2013.01); *F16C 13/02* (2013.01); *Y10T 74/211* (2015.01); *Y10T 74/2116* (2015.01)

(58) Field of Classification Search
CPC ....... F16C 3/02; F16C 13/02; B22D 11/1287; Y10T 29/49544; Y10T 29/49547
USPC .................. 492/16, 28, 30, 31, 33, 34, 36, 57
See application file for complete search history.

(56) References Cited

U.S. PATENT DOCUMENTS

| 1,989,439 | A | * | 1/1935 | Ahearn ............................... 57/90 |
| 4,137,963 | A |   | 2/1979 | Langer et al. |
| 2005/0133190 | A1 | * | 6/2005 | Axelsson et al. ............. 164/448 |
| 2006/0157922 | A1 | * | 7/2006 | Carter et al. .................. 271/264 |

FOREIGN PATENT DOCUMENTS

| EP | 1537927 A1 | 6/2005 |
| GB | 1500827 A | 2/1978 |
| JP | 51065272 A | 6/1976 |
| JP | 53047330 A | 4/1978 |
| JP | 55148848 U | 10/1980 |
| JP | 58185356 U | 12/1983 |
| JP | 2005161405 A | 6/2005 |
| JP | 2007098474 A | 4/2007 |

* cited by examiner

*Primary Examiner* — Christopher Besler
(74) *Attorney, Agent, or Firm* — Bryan Peckjian; SKF USA Inc. Patent Dept.

(57) ABSTRACT

The invention comprises a non-rotating shaft for supporting a mechanical element of a roll segment in a continuous casting machine, having an essentially circular cross-section. The circular cross-section presents a portion having a smooth peripheral, wherein the distance between any point of the portion and a center of the circular cross-section is shorter than a radius of the circular cross-section. Furthermore, the circular cross-section presenting the portion extends axially, which defines a section of the shaft meant to a least partly receive the mechanical element, and the section of the shaft is meant to receive a load at least partly at the portion. In addition, according to a second aspect, the invention comprises a segment roll for a continuous casting machine, which comprises the non-rotating shaft according to the first aspect.

20 Claims, 4 Drawing Sheets

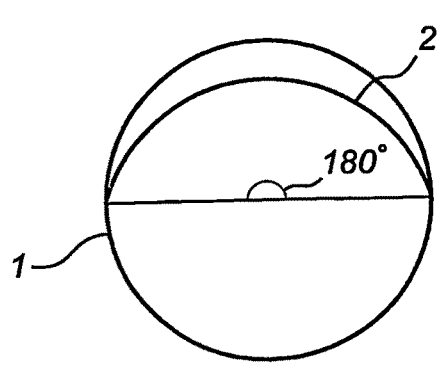
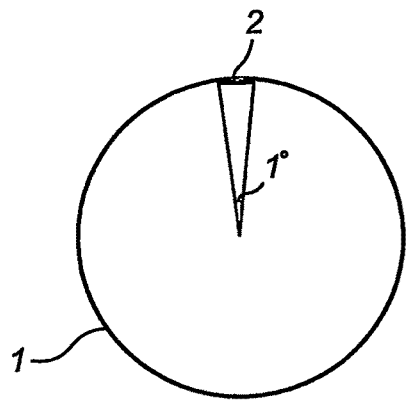
Fig. 1a  Fig. 1b
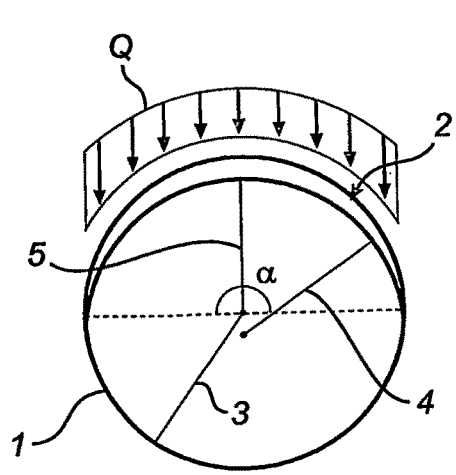
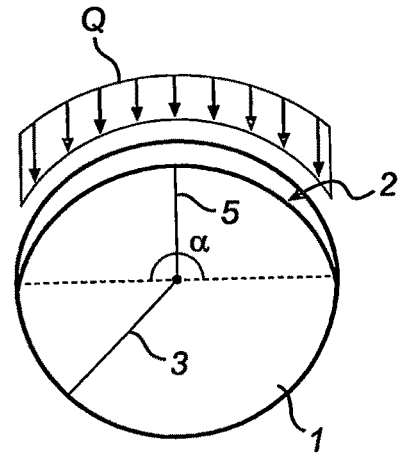
Fig. 2  Fig. 3

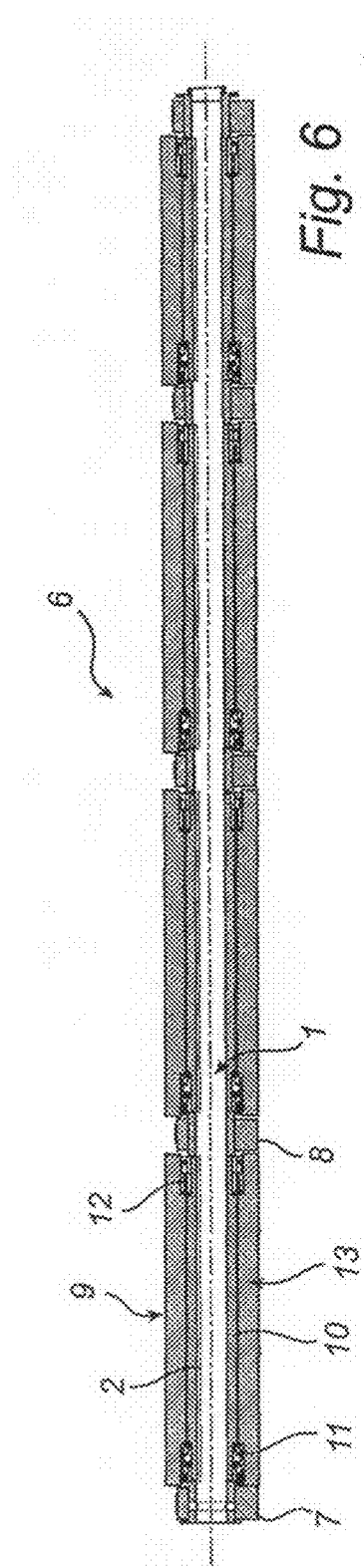
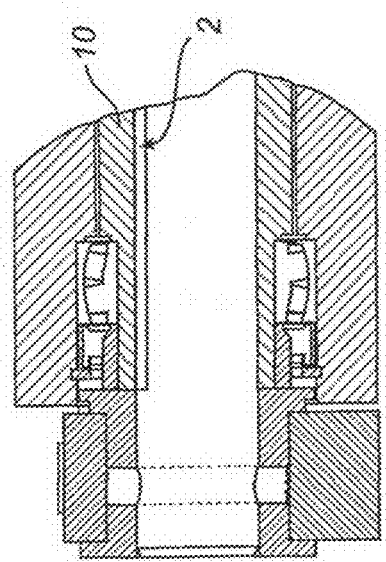

NON-ROTATING SHAFT FOR A CONTINUOUS CASTING MACHINE

FIELD OF THE INVENTION

According to a first aspect, the invention concerns a non-rotating shaft for supporting a mechanical element of a roll segment in a continuous casting machine. According to a second aspect, the invention concerns a segment roll for a continuous casting machine having a non-rotating shaft.

BACKGROUND OF THE INVENTION

It is well known that bearings have shorter bearing life when used in harsh environments. This applies to bearings used in continuous casting machines. The continuous casting process is characterized by high loads on the rollers of the segment rolls, on which the slab, billet, bloom or beam blank runs. Furthermore, the process is characterized by high temperatures, high humidity, high contamination etc. A number of segment roll designs have been proposed. One such segment roll is introduced in EP1537927, which describes the configuration of a segment roll with a non-rotating shaft supporting a number of roll segments. EP1537927 provides a solution that facilitates transporting of the segment roll. Furthermore, it ascertains the sealing effect of each roll segment, and also that the bearings supporting the roll segments are not subjected to scratches or other damages during assembly.

Still, there is a need to ascertain a good osculation between the inner ring of the bearing and the shaft, and to facilitate service and replacement of the roll segments in the segment roll.

SUMMARY OF THE INVENTION

An object of the invention is to ascertain a good osculation between a mechanical element of a roll segment and a non-rotating shaft in a continuous casting machine, and to facilitate service and replacement of a roll segment in a segment roll. More specifically, the object is to improve the osculation between a non-rotating shaft and an inner ring of a bearing and to facilitate service and replacement of the roll segments in a segment roll.

According to the first aspect, the object is achieved by a non-rotating shaft for supporting a mechanical element of a roll segment in a continuous casting machine, the non-rotating shaft having an essentially circular cross-section. The circular cross-section presents a portion having a smooth peripheral, wherein the distance between any point of the portion and a center of the circular cross-section is shorter than a radius of the circular cross-section. A smooth peripheral is not a rough or irregular peripheral such as a sinus curve or any similar bumpy surface. Thus, when osculating, there is a larger contact area between the shaft and the inner ring. In an embodiment, the point may be any point of the portion at all angles within an open angle interval of the portion. Such an angle interval would be based on the center of the circular cross-section. Furthermore, the circular cross-section presenting the portion extends axially, which defines a section of the shaft meant to at least partly receive the mechanical element, and the section of the shaft is meant to receive a load at least partly at the portion.

In an embodiment, the mechanical element is a sleeve or an inner ring of a bearing.

In an embodiment, the inner circumference of the mechanical element is essentially circular.

In an embodiment, a gap has been introduced between the non-rotating shaft and the mechanical element, i.e. the diameter of the circular cross-section of the non-rotating shaft is smaller than the inner diameter of the mechanical element. This further facilitates mounting and dismounting of the roll segment on the non-rotating shaft.

An effect of the invention is that by this configuration of the non-rotating shaft, the osculation between the mechanical element and the non-rotating shaft is improved. This is achieved by the configuration of the portion, which increases the contact zone between the non-rotating shaft and the mechanical element. Thus, when the non-rotating shaft supports a bearing arrangement, the invention increases the bearing life, and permits a good ability to mount and dismount the bearing arrangement onto the non-rotating shaft. Another advantage is that the invention leads to an increased load capacity of the bearing arrangement, and permits a good ability to mount and dismount the bearing arrangement onto the non-rotating shaft.

In an embodiment of the non-rotating shaft, the distance between any point of the portion and a center of the circular cross-section is maximum 10 percent shorter than a radius of the circular cross-section.

In an embodiment of the non-rotating shaft, the distance between any point of the portion and a center of the circular cross-section is maximum 8 percent shorter than a radius of the circular cross-section.

In an embodiment of the non-rotating shaft, the distance between any point of the portion and a center of the circular cross-section is maximum 6 percent shorter than a radius of the circular cross-section.

In an embodiment of the non-rotating shaft, the distance between any point of the portion and a center of the circular cross-section is maximum 4 percent shorter than a radius of the circular cross-section.

In an embodiment of the non-rotating shaft, the distance between any point of the portion and a center of the circular cross-section is maximum 2 percent shorter than a radius of the circular cross-section.

In an embodiment of the non-rotating shaft, the distance between any point of the portion and a center of the circular cross-section is maximum 1 percent shorter than a radius of the circular cross-section.

In an embodiment of the non-rotating shaft, the portion has a circumferential angle in the interval 1 to 180 degrees. Such an angle would be based on the center of the circular cross-section. Without being limited to these intervals, there are more intervals, which lie within the invention.

In an embodiment of the non-rotating shaft, the portion has an angle in the interval 10 to 180 degrees.

In an embodiment of the non-rotating shaft, the portion has an angle in the interval 30 to 180 degrees.

In an embodiment of the non-rotating shaft, the portion has an angle in the interval 50 to 180 degrees.

In an embodiment of the non-rotating shaft, the portion has an angle in the interval 70 to 180 degrees.

In an embodiment of the non-rotating shaft, the portion has an angle in the interval 90 to 180 degrees.

In an embodiment of the non-rotating shaft, the portion has an angle in the interval 110 to 180 degrees.

In an embodiment of the non-rotating shaft, the portion has an angle in the interval 120 to 180 degrees.

In an embodiment of the non-rotating shaft, the portion has an angle in the interval 140 to 180 degrees.

In an embodiment of the non-rotating shaft, the portion is a convex shaped arc.

In an embodiment of the non-rotating shaft, the portion is a circular arc having a radius essentially the same as the radius of the circular Cross-section. However, the center point of this circular arc is somewhat displaced from the center of the circular cross-section.

In an embodiment of the non-rotating shaft, the portion is a circular arc having a larger radius than the radius of the circular cross-section. As a consequence, the osculation may be further improved.

In an embodiment of the non-rotating shaft, the portion is an elliptic arc. As a consequence, the osculation may be further improved.

In an embodiment of the non-rotating shaft, the portion is constituted by one of a straight line or a plurality of interconnected straight lines. As a consequence, the osculation may be further improved.

In an embodiment, the non-rotating shaft has at least two portions axially spaced apart.

In an embodiment of the non-rotating shaft, each portion is located in the same circumferential angular position in the circular cross-sections.

In an embodiment of the non-rotating shaft, the portions are essentially identical.

In an embodiment of the non-rotating shaft, the portions are different. This is advantageous when the load on the shaft is unevenly distributed.

In an embodiment of the non-rotating shaft, having more than two portions, the adjacent ends of each portion are spaced apart at essentially equal distances.

In an embodiment of the non-rotating shaft, having more than two portions, the adjacent ends of each portion are spaced apart at different distances. This is advantageous when the load on the shaft is unevenly distributed.

In embodiments of the non-rotating shaft, the distance between the adjacent ends of the portions is between 30 to 300, 50 to 280, 70 to 260, 90 to 240, 110 to 240, 130 to 220 or 150 to 200 millimeters.

In embodiments of the non-rotating shaft, when a billet, bloom or beam blank is considered, the length of the shaft is between 0.3 to 0.9, 0.4 to 0.8 or 0.5 to 0.7 meters.

In embodiments of the non-rotating shaft, when a slab is considered, the length of the shaft is between 0.3 to 4, 0.5 to 3.8, 0.7 to 3.6, 0.9 to 3.4, 1.1 to 3.2, 1.3 to 3, 1.5 to 2.8, 1.7 to 2.6 or 1.9 to 2.4 meters.

In embodiments of the non-rotating shaft, when a billet, bloom or beam blank is considered, the section of the non-rotating shaft presenting the portion extends axially at least 100, 150, 200, 250, 300, 350, 400, 450, 500, 550 or 600 millimeters.

In embodiments of the non-rotating shaft, when a slab is considered, the section of the non-rotating shaft presenting the portion extends axially at least 200, 250, 300, 350, 400, 450, 500, 550, 600, 650, 700, 750, 800, 850, 900, 950, 1000, 1050, 1100, 1150, 1200, 1250 or 1300 millimeters.

In an embodiment of the non-rotating shaft, the section of the non-rotating shaft presenting the portion extends axially along the whole shaft.

According to the second aspect, it also lies within the invention to provide a segment roll for a continuous casting machine, which comprises the non-rotating shaft, wherein the mechanical element comprises an inner sleeve mounted onto the non-rotating shaft. It should be noted that all features and embodiments according to the first aspect are applicable to the second aspect of the invention and vice versa. At least two bearings are mounted on the inner sleeve at a distance in axial direction and an outer sleeve shaped mantle is mounted on the at least two bearings. The section of the non-rotating shaft that has the portion essentially supports the inner sleeve.

In an embodiment, the inner circumference of the inner sleeve is essentially circular.

In an embodiment, a gap has been introduced between the non-rotating shaft and the inner sleeve, i.e. the diameter of the circular cross-section of the non-rotating shaft is smaller than the inner diameter of the inner sleeve. This further facilitates mounting and dismounting of the roll segment on the non-rotating shaft.

An effect of this configuration is that the osculation between the bearings and the shaft improves due to the configuration of the non-rotating shaft. Thus, the invention increases the bearing life, and permits a good ability to mount and dismount the mechanical element onto the non-rotating shaft. Another advantage is that the invention permits an increased load capacity of the bearings, while still having good ability to mount and dismount the mechanical element onto the non-rotating shaft.

In an embodiment, the segment roll comprises at least two mechanical elements.

In an embodiment, the mechanical element is a roll segment.

In an embodiment, the segment roll comprises at least two roll segments.

BRIEF DESCRIPTION OF DRAWINGS

FIG. 1a: A cross-section of a non-rotating shaft, presenting an example of a portion according to the present invention.

FIG. 1b: A cross-section of a non-rotating shaft, presenting an example of a portion according to the present invention.

FIG. 2: A cross-section of a non-rotating shaft according to the present invention, wherein the portion is a circular convex shaped arc.

FIG. 3: A cross-section of a non-rotating shaft with an elliptic arc-shaped portion according to the present invention.

FIG. 6: A segment roll for a continuous caster with a non-rotating shaft according to the present invention.

FIG. 7: An enlarged view of a section of the segment roll in FIG. 6.

DETAILED DESCRIPTION OF THE DRAWINGS

Figures 4, 5:
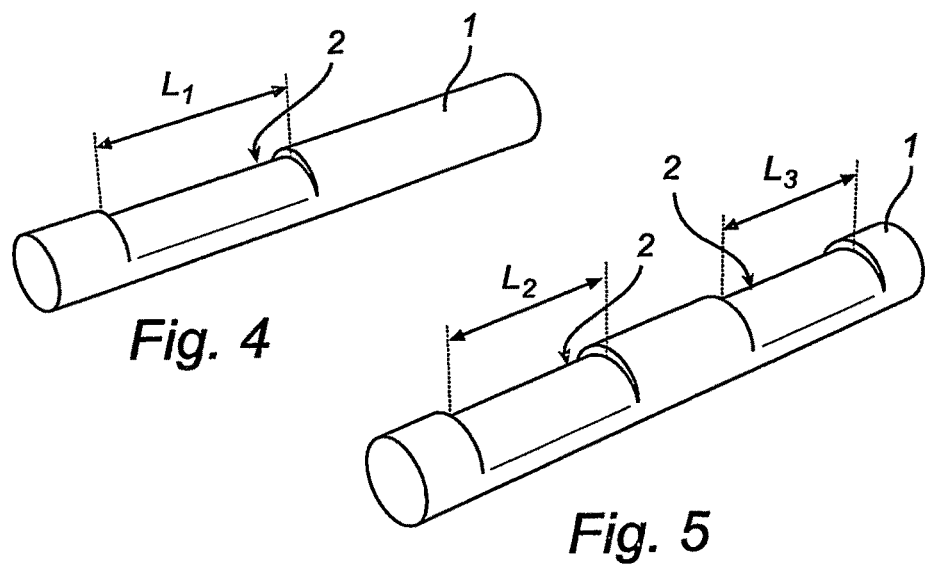
FIG. 4: A non-rotating shaft according to the present invention with one section presenting a portion.
FIG. 5: A non-rotating shaft according to the present invention with more than one section presenting a portion.

It should be understood that some features in the figures are exaggerated in order to clarify the inventive idea.

In FIG. 1a and 1b, two embodiments of a cross-section of a non-rotating shaft 1 according to the invention are disclosed. It shows that the non-rotating shaft 1 may be designed to have different angles in the interval of the portion 2. In FIG. 1a, the portion 2 has an angle in the interval, which in this embodiment is 180 degrees. In FIG. 1b, the portion 2 has an angle in the interval, which in this embodiment is 1 degree. In a preferred embodiment, the angle is 180 degrees. It should be understood that the claimed invention could have any other angle in the interval 1 to 180 degrees.

In FIG. 2, a cross-section of another embodiment of a non-rotating shaft 1 according to the invention is disclosed. It comprises a radius 3 of the circular cross-section and a portion 2. In this embodiment, the portion 2 is in the shape of a circular arc having a radius 4 larger than the radius 3 of the circular cross-section. During operation, a load Q is at least partly located at the portion 2. A distance 5 between any point of the portion 2 and a center of the circular cross-section is shorter than the radius 3 of the circular cross-section. Furthermore, the portion 2 has a circumferential angle α.

In FIG. 3, a cross-section of another embodiment of a non-rotating shaft 1 according to the invention is disclosed. It comprises a radius 3 of the circular cross-section and a portion 2. In this embodiment, the portion 2 is in the shape of an elliptic arc. During operation, a load Q is at least partly located at the portion 2. A distance 5 is between any point of the portion 2 and a center of the circular cross-section shorter than the radius 3 of the circular cross-section. Furthermore, the portion 2 has a circumferential angle α.

In FIG. 4, another embodiment of a non-rotating shaft 1 according to the invention is disclosed. It comprises a section L1 of the shaft that extends axially along the shaft presenting a portion 2. The section Li on the shaft may also extend along the whole non-rotating shaft 1.

In FIG. 5, another embodiment of a non-rotating shaft 1 according to the invention is disclosed. It comprises two sections L2, L3 of the shaft that extends axially along the non-rotating shaft 1. The two sections L2, L3 present one portion 2 each. In this embodiment, the portions 2 are aligned in an angular position, i.e. the portions' angle positions in the circular cross section of the non-rotating shaft 1 are essentially identical. The design of the portions 2 on the non-rotating shaft may be identical. The portions 2 may different. It should also be understood that there could be more than two portions 2 along the non-rotating shaft 1.

In FIG. 6, an embodiment of a segment roll 6 for a continuous casting machine with a non-rotating shaft 1 according to the invention is disclosed. It comprises the non-rotating shaft 1, supported by blocks 7, 8, with at least one roll segment 9. Each roll segment 9 comprises an inner sleeve 10 and bearings 11, 12 mounted onto the inner sleeve 10. The bearings 11, 12 may be a locating and a non-locating bearing. In this embodiment, the bearings 11, 12 are an SRB (Spherical Roller Bearing) and a toroidal bearing (for instance SKF's CARB). Furthermore, an outer sleeve shaped mantle 13 is mounted onto the bearings 11, 12, meant to receive a slab, billet, bloom or beam blank that induces a load onto the segment roll 6. Each roll segment 9 may contain a sealing arrangement, e.g. a sealing cassette on each side of the roll segment 9. The non-rotating shaft 1 has a portion 2 according to the invention extending along the inner sleeve 10. The portion 2 may be in any shape within the invention. In a preferred embodiment, the portion 2 is a circular convex shaped arc with a radius larger than the radius of the circular cross-section of the non-rotating shaft 1. Furthermore, in a preferred embodiment, a gap, not shown in the figure, between the circular cross-section of the non-rotating shaft 1 and the inner sleeve 10 is present to further facilitate mounting and dismounting of the roll segments 9. The portion 2 improves the osculation between the roll segment 9 and the non-rotating shaft 1, and thereby improves the load capacity of the bearings 11, 12. Also, bearing life is improved.

In FIG. 7, an enlarged view of a section of the segment roll 6 in FIG. 6 is shown. In this embodiment, the portion 2 extends along the inner sleeve 10.

Figure 8:
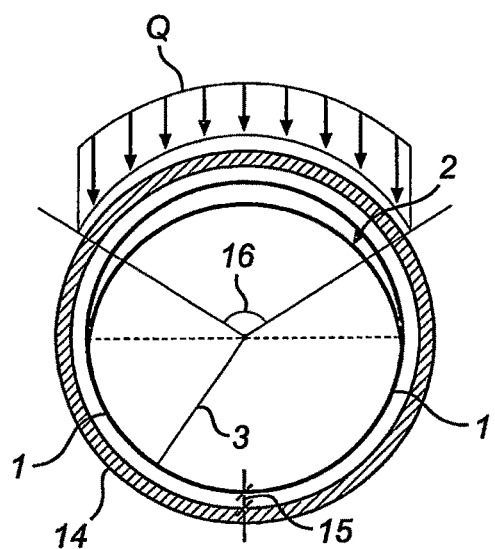
FIG. 8: A cross-section of a non-rotating shaft according to the present invention, which receives a mechanical element.

In FIG. 8, a cross-section of another embodiment of a non-rotating shaft 1 according to the present invention is disclosed. It comprises a radius 3 of the circular cross-section and a portion 2. The non-rotating shaft 1 receives a mechanical element 14, which in this embodiment is a sleeve. A gap 15 is present between the circular cross-section of the non-rotating shaft 1 and the mechanical element 14. This to further improve mounting and dismounting of the mechanical element 14. Furthermore, the portion 2 improves the osculation between the mechanical element 14 and the non-rotating shaft 1 when a load Q is applied onto the mechanical element 14. In a preferred embodiment, a bearing is mounted onto the mechanical element 14. The portion 2 increases the contact area between the non-rotating shaft 1 and the mechanical element 14, and thereby increases the loaded zone 16 of the bearing, which improves the load capability of the bearing. In a preferred embodiment, the contact area between the mechanical element 14 and the non-rotating shaft 1 is 120 degrees. Furthermore, bearing life is improved.

The invention claimed is:

1. A non-rotating shaft for supporting a mechanical element of a roll segment in a continuously casting machine, the non-rotating shaft comprising:
    a substantially circular cross-section;
    a portion with a continuous periphery, wherein:
        a first radical distance between a first point on the periphery of the portion and a center of the shaft is different from a second radial distance between a second point on the periphery of the portion and the center of the shaft,
        the first and second points are both disposed in a single cross-section of the shaft, the cross-section being perpendicular to an axis of the shaft,
        the first and second points are angularly offset by a non-zero angle about the axis,
        the first and second radial distances are both less than a radius of the circular cross-section, the portion extending axially and circumferentially on the shaft through an angle of between about one degree and about 180 degrees,
        the portion is a convex shaped arc, and
        the shaft transitions to and from the portion at two locations separated by the angle such that no edge surface is formed at either of the two locations and the two locations are disposed on the single cross-section containing the first and second points; and
    a section that includes the portion and is configured to at least partly receive the mechanical element, the section being further configured to receive a load at least partly at the portion.

2. The non-rotating shaft according to claim 1, wherein the distance between any point of the portion, including the first and second points, and the center of the shaft is a maximum of ten percent (10%) shorter than the radius of the circular cross section.

3. The non-rotating shaft according to claim 1, wherein the portion defines a radius that is substantially a same as the radius of the circular cross-section.

4. The non-rotating shaft according to claim 1, wherein the convex shape arc of the portion is a circular arc having a larger radius than the radius of the circular cross-section.

5. The non-rotating shaft according to claim 1, wherein the convex shaped arc of the portion is an elliptic arc.

6. The non-rotating shaft according to claim 1, having at least two portions axially spaced apart.

7. The non-rotating shaft according to claim 6, wherein the at least two portions are substantially axially aligned.

8. The non-rotating shaft according to claim 6, wherein the at least two portions are one of substantially identical and different.

9. The non-rotating shaft according to claim 6, wherein the shaft has more than two portions each having opposing ends, adjacent ends of each pair of adjacent portions being spaced apart axially by substantially equal distances.

10. The non-rotating shaft according to claim 6, wherein the shaft has more than two portions, adjacent ends of each pair of adjacent portions being spaced apart by different distances.

11. The non-rotating shaft according to claim 6, wherein the at least two portions are spaced apart by distance of between about thirty (30) millimeters to about three hundred (300) millimeters.

12. The non-rotating shaft according to claim 1, wherein the shaft has a length of between about three-tenths (0.3) meters and about four (4) meters.

13. The non-rotating shaft according to claim 1, wherein the section extends axially at least one hundred (100) millimeters.

14. The non-rotating shaft according to claim 1, wherein the section extends axially along the whole shaft.

15. A segment roll for a continuous casting machine comprising:
a non-rotating shaft having a substantially circular cross-section, the shaft including a portion with a continuous periphery, wherein a first radial distance between a first point on the periphery of the portion and a center of the shaft is different from a second radial distance between a second point on the periphery of the portion and the center of the shaft, wherein the first and second points are both disposed in a single cross-section of the portion, the cross-section being perpendicular to an axis of the shaft, wherein the first and second points are angularly offset by a non-zero angle about the axis, wherein the first and second radial distances are both less than a radius of the circular cross-section, the portion extending axially and circumferentially on the shaft through an angle having a value between about one degree and about 180 degrees, and wherein the portion is a convex shaped arc, the shaft having a section that includes the portion, and the shaft section being further configured to receive a load at least partly at the portion; and
a mechanical element including an inner sleeve mounted onto the non-rotating shaft, at least two bearings mounted on the inner sleeve at a distance in an axial direction, and an outer sleeve shaped mantle mounted on the at least two bearings,
wherein the inner sleeve is substantially supported by the shaft section having the portion.

16. A segment roll according to claim 15, wherein the segment roll includes at least two of the mechanical elements.

17. A segment roll according to claim 15, wherein the mechanical element is a roll segment.

18. The segment roll according to claim 15, wherein the shaft transitions smoothly to and from the portion at two locations separated by the angle such that no lip is formed at either of the two locations.

19. The non-rotating shaft according to claim 1, further comprising the mechanical element around the shaft, wherein the mechanical element is a portion of a roller bearing or a sleeve.

20. The non-rotating shaft according to claim 19, wherein a gap exists between the circular cross-section and the mechanical element.

* * * * *